(12) United States Patent
Veeneman

(10) Patent No.: US 11,827,081 B2
(45) Date of Patent: Nov. 28, 2023

(54) MOBILE ACCOMODATION, CASING FRAME AND FASTENING CLIP

(71) Applicant: POLYPLASTIC GROUP B.V., Rotterdam (NL)

(72) Inventor: Jan Peter Veeneman, Bergschenhoek (NL)

(73) Assignee: POLYPLASTIC GROUP B.V., Rotterdam (NL)

( * ) Notice: Subject to any disclaimer, the term of this patent is extended or adjusted under 35 U.S.C. 154(b) by 899 days.

(21) Appl. No.: 16/612,264

(22) PCT Filed: May 11, 2018

(86) PCT No.: PCT/NL2018/050313
§ 371 (c)(1),
(2) Date: Nov. 8, 2019

(87) PCT Pub. No.: WO2018/208161
PCT Pub. Date: Nov. 15, 2018

(65) Prior Publication Data
US 2020/0062088 A1    Feb. 27, 2020

(30) Foreign Application Priority Data

May 11, 2017    (NL) ..................................... 2018893

(51) Int. Cl.
*B60J 1/00*    (2006.01)
*F16B 2/24*    (2006.01)
(Continued)

(52) U.S. Cl.
CPC ............. *B60J 1/006* (2013.01); *B60J 1/007* (2013.01); *F16B 2/245* (2013.01); *B60J 1/2013* (2013.01); *F16B 2/22* (2013.01)

(58) Field of Classification Search
CPC .......... B60J 1/006; B60J 1/007; B60J 1/2013; F16B 2/245; F16B 2/22
(Continued)

(56) References Cited

U.S. PATENT DOCUMENTS

2007/0056231 A1    3/2007    DiMario et al.
2009/0229094 A1*   9/2009    Reese .................... B60J 1/06
                                                      296/96.2
(Continued)

FOREIGN PATENT DOCUMENTS

EP    0258128        3/1998
EP    0867590 A1 *   9/1998
(Continued)

*Primary Examiner* — Amy R Weisberg
*Assistant Examiner* — Dana D Ivey
(74) *Attorney, Agent, or Firm* — Perry + Currier Inc.

(57) ABSTRACT

Mobile accommodation, comprising a wall (10) with a wall opening (20) bounded by an edge. Received in the wall opening is a casing frame (30) which is intended and configured to comprise an openable or non-openable panel (25). The casing frame extends outside the wall opening on a first side of the wall while it is fixed in the wall opening by means of fixation means. The casing frame comprises for this purpose an insertion cavity (35) accessible from an opposite side of the wall. The fixation means comprise at least one fastening clip (60) which at a first outer end comprises an insertion member (65) which protrudes into the insertion cavity (35) in order to effect a durable mutual connection therein, and at a second outer end supports directly or indirectly on the wall.

17 Claims, 2 Drawing Sheets

(51) Int. Cl.
*B60J 1/20* (2006.01)
*F16B 2/22* (2006.01)

(58) Field of Classification Search
USPC ......................................................... 160/371
See application file for complete search history.

(56) References Cited

U.S. PATENT DOCUMENTS

| | | |
|---|---|---|
| 2012/0084949 A1 | 4/2012 | Al-Basri |
| 2015/0084367 A1* | 3/2015 | Turner .................... B60J 1/006 |
| | | 296/146.15 |
| 2016/0213137 A1 | 7/2016 | Sellars |

FOREIGN PATENT DOCUMENTS

| | | |
|---|---|---|
| FR | 3040659 A1 | 3/2017 |
| WO | WO-2013156802 A1 | 10/2013 |
| WO | WO-2015166273 A1 | 11/2015 |

\* cited by examiner

MOBILE ACCOMODATION, CASING FRAME AND FASTENING CLIP

The present invention relates to a mobile accommodation, comprising a wall with a wall opening bounded by an edge, wherein in the wall opening a casing frame is received which is intended and configured to comprise an openable or non-openable panel, which casing frame extends outside the wall opening on a first side of the wall and is fixed in the wall opening by means of fixation means.

The invention relates particularly here to a mobile accommodation in the form of a caravan or camper, also referred to as a mobile home. Such an accommodation is characterized by walls formed from sandwich panels. These panels comprise an insulating core of polymer foam on either side of which a covering is arranged. On an outer side this is usually aluminum or plastic, while on the inside, with comfort and aesthetics in mind, a wood veneer or wood fiber panel is often applied. At a position where a door, skylight, window or other openable or non-openable panel has to be realized a recess is arranged in the wall. In order to facilitate mounting of the panel use is preferably made of a casing frame which is placed in the thus provided wall opening and fixed therein. The panel is mounted in the casing frame while possible fittings (hinges and locks) have already been arranged therein beforehand. Mounting of a window or other panel in the thus provided opening can hereby take place relatively quickly and easily.

Usually used as fixation means for fixing the casing frame in the wall opening are screws which each have to be tightened manually. Particularly in the case of panels of larger dimensions, and so larger numbers of screws, this is time-consuming.

The present invention therefore has for its object, among others, to provide a mobile accommodation with a wall opening in which a casing frame can be fixed in a considerably shorter time.

In order to achieve the stated object a mobile accommodation of the type described in the preamble is characterized according to the invention in that the casing frame comprises at least one insertion cavity accessible from an opposite side of the wall, that the fixation means comprise at least one fastening clip which at a first outer end comprises an insertion member which protrudes into the insertion cavity in order to effect a durable mutual connection therein and at a second outer end supports directly or indirectly on an edge part of the wall adjacent to the edge of the wall opening. Provision is thus already made in the casing frame in the form of the insertion cavity in combination with fastening clips adapted thereto to enable fixing in the wall opening without further tools. These fixation means can be pressed easily into the insertion cavity so as to make a firm connection therewith. If desired however, an applicator tool which is specifically adapted to the clips and developed specially therefor can also be applied here with a cartridge for a series of such fastening clips in order to obviate manual placing of the clips and to further simplify mounting of the casing frame. On the outer side the casing frame protrudes outside the wall opening so that the wall is thus clamped between this part of the casing frame and the fastening clips. A preferred embodiment of the mobile accommodation has the feature here that the second part of the fastening clip supports directly or indirectly in resilient manner on the wall counter to a spring tension. The resilience of the fastening clips here ensures a clearance-free securing of the wall.

A particular embodiment of the mobile accommodation is characterized in that the fastening clip comprises a curved resilient plate body, in particular of metal, and more particularly of spring steel. Such clips can be manufactured at a relatively low cost price and are found in practice to be highly suitable as fixation means for the casing frame. In order to be able to compensate possible dimensional fluctuations between the wall and the clips a further particular embodiment of the mobile accommodation has the feature according to invention that the insertion cavity comprises a snap cavity with a series of shoulders, and that the insertion member comprises a snap member which snaps behind a shoulder of the series of shoulders in the snap cavity. The series of shoulders thus provides a stepped adjustment and adaptation of the connection to the fastening clip. This series of shoulders can for instance be provided in the form of an internal toothing, in particular a sawtooth, inside the cavity which extends on one or more sides from the wall of the insertion cavity. In a further preferred embodiment the mobile accommodation according to the invention is characterized here in that the snap member extends resiliently from an adjacent part of the fastening clip. The snap member is thus able to snap behind each successive shoulder or tooth of the toothing until an end point has been reached.

In order to ensure that the casing frame can later no longer become detached from the wall opening, a further particular embodiment of the mobile accommodation according to the invention has the feature that at least one fastening clip is anchored in the wall by means of an invasive fastening member. This invasive fastening member is for instance a screw with which a fastening clip is screwed fixedly at one or several locations into an edge part of the wall adjacent to the wall opening. For the purpose of placing the fastening member an opening is provided in the fastening clip. This opening also serves to facilitate an optional removal of the fastening clips. The casing frame is thus anchored permanently in the wall, while the casing frame is held in place at other locations by means of fastening clips, optionally without such a further anchoring.

In order to enable free selection of the in situ positioning of the fastening clips a further preferred embodiment of the mobile accommodation has the feature according to the invention that the insertion cavity extends in the casing frame over at least substantially a full length thereof. The casing frame thus provides a mounting base for one or more fastening clips along this whole length. Both the number and the exact position of this (these) clip(s) can be freely chosen and adjusted here outside the location(s) where other parts may have to be mounted.

A further particular embodiment of the mobile accommodation has the feature according to the invention that the wall opening comprises a window opening which is provided on at least one side thereof with a window covering unit and that the window covering unit comprises at least one insertion member which protrudes into the insertion cavity in order to effect a durable mutual connection therein. Such a window covering unit comprises for instance a roller blind which has to be provided adjacently of the opening. It is possible to opt for a similar type of attachment herefor as that between the casing frame and the fastening clips. In the same way as a fastening clip, the insertion member of the window covering unit protrudes into the insertion cavity of the casing frame for anchoring therein.

A preferred embodiment of the mobile accommodation has the feature here that the window covering unit comprises an elongate groove which extends therein along at least substantially a full length and that the insertion member extends from a connecting body received for axial movement in the groove. The mounting body can slide in the groove here to an optimal position for fastening in the insertion cavity of the casing frame. This groove moreover provides space for a back of the fastening clip(s) which elsewhere fix the casing frame in the wall opening.

The invention also relates to a fastening clip and casing frame of the type as applied in the above described mobile accommodation according to the invention, and will now be further elucidated on the basis of an exemplary embodiment and an accompanying drawing. In the drawing.

The figures are otherwise purely schematic and not (always) drawn to scale. Some dimensions in particular may be exaggerated to greater or lesser extent for the sake of clarity. Corresponding parts are designated in the figures with the same reference numeral.

Figure 1:
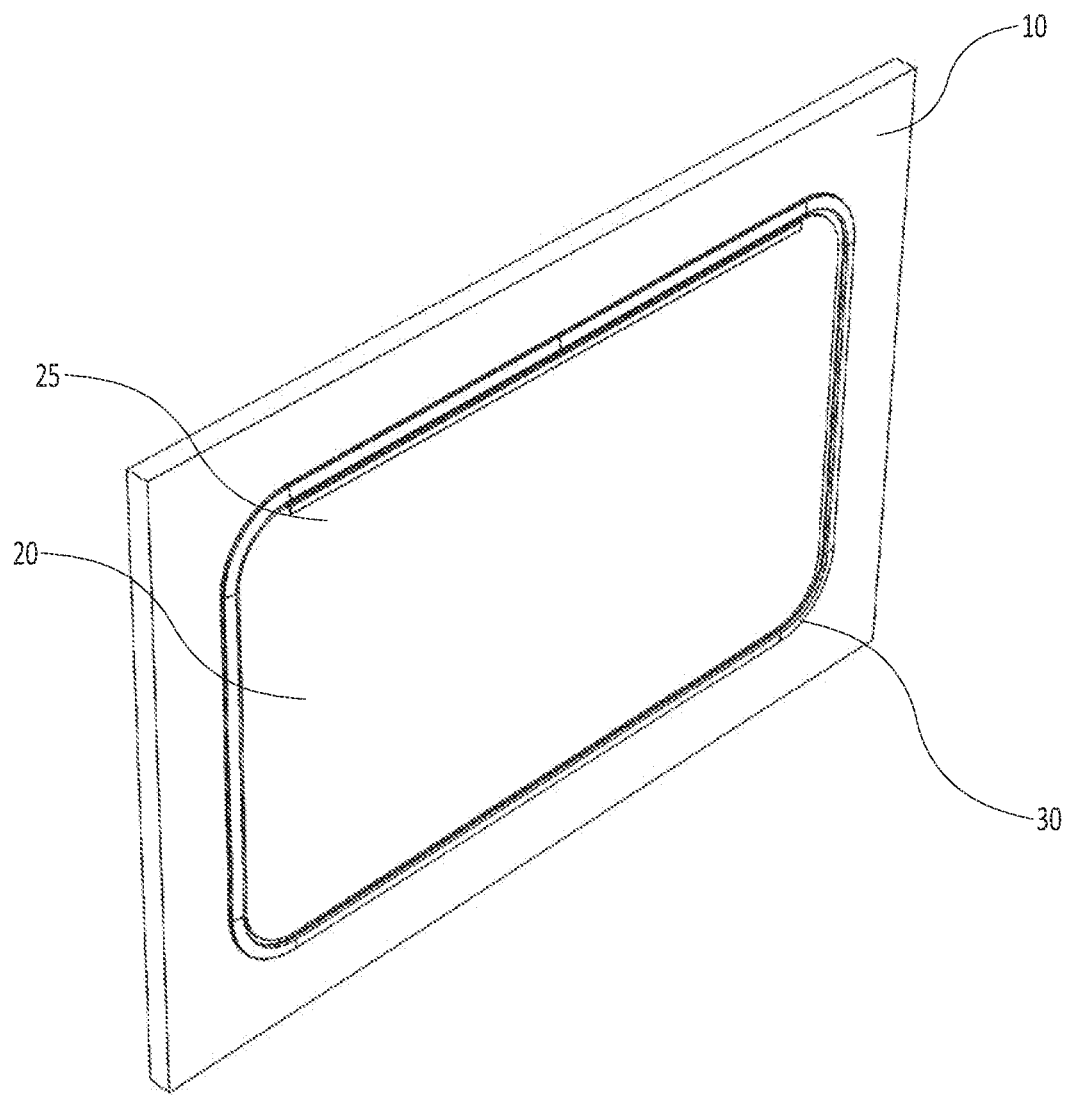
FIG. 1 shows a wall of an exemplary embodiment of a mobile accommodation according to the invention with a wall opening in which a casing frame with a panel is placed.

The mobile accommodation shown in FIG. 1 comprises a space bounded by walls 10 on a rolling chassis. This embodiment relates to a towed accommodation, normally referred to as a caravan, but may also relate to a tractive vehicle, normally referred to as a camper or mobile home. The invention can otherwise also be applied to other types of mobile accommodation, such as for instance boats and yachts. A wall opening 20 is provided in wall 10 of the accommodation for receiving an openable window 25. Window 25 is for this purpose hung in a casing frame 30 which is placed in wall opening 20 and extends all around therein. Walls 10 of such an accommodation are normally assembled from sandwich panels with a relatively thin outer skin 21 of for instance plastic or aluminum and an inner wall 22 of plastic or wood sheet veneer which are separated from each other by a core 23 of thermally insulating polymer foam. At the location where a window, door, roof hatch or other type of panel has to be provided openings adapted for the purpose are recessed therein in the associated wall. Such a casing frame 30 is advantageously arranged in the thus created wall opening in order to facilitate final assembly of the panel for the builder of the accommodation. This is because, in addition to providing an attractive edge finish of wall opening 25, casing frame 30 provides for diverse mounting provisions, such as for attachment of the panel and related parts such as sealing rubbers 40, optional hinges and locks and optional window covering products. The casing frame is usually formed from an extrusion profile of plastic or aluminum. In the present example use is made of a casing frame 30 of extruded aluminum.

Figure 2:
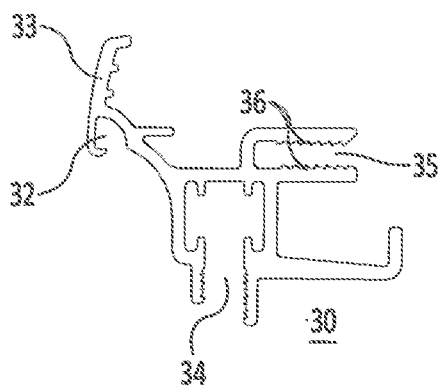
FIG. 2 shows a cross-section of the casing frame as applied in the mobile accommodation of FIGS. 1A and 1B.
Figure 1A:
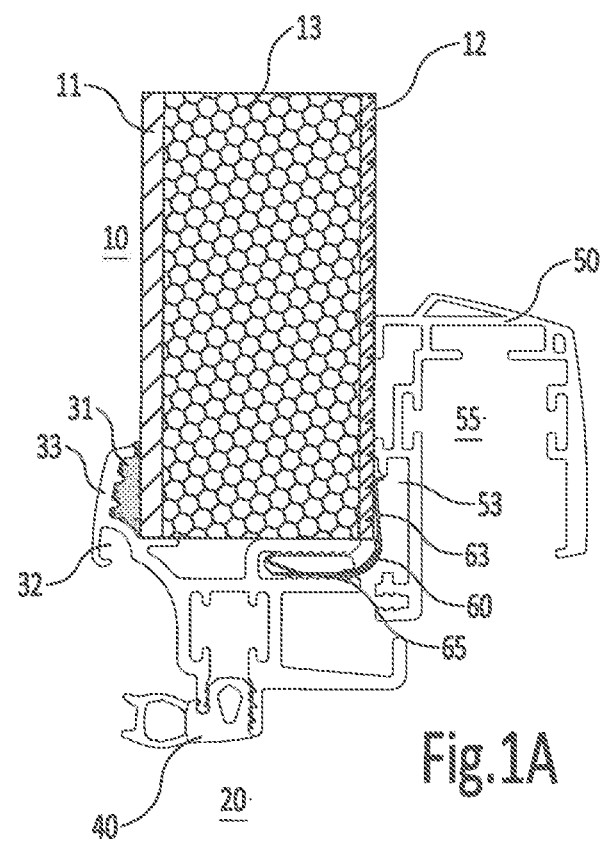
FIG. 1A shows a first cross-section through a part of the wall of the mobile accommodation of FIG. 1.
Figure 1B:
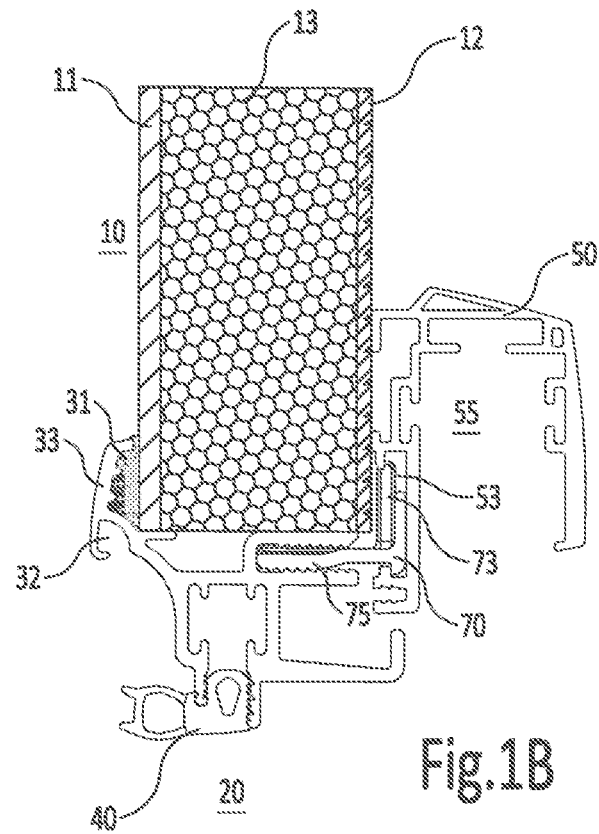
FIG. 1B shows a second cross-section through a part of the wall of the mobile accommodation of FIG. 1.

FIGS. 1A and 1B show in further detail a cross-section of the attachment of casing frame 30 in wall opening 20, while FIG. 2 shows a cross-section of the casing frame as such. A tongue 33 of casing frame 30 protrudes from opening 20 on an outer side of the accommodation and rests against an edge part of wall 10 adjacent to the opening. For an effective sealing a sealing means, such as an adhesive bead or mastic bead 31, is arranged between tongue 33 and an edge part of wall 10 adjacent to the wall opening. The casing frame comprises adjacently of the tongue a beading part 32 with a cup-shaped cavity in which a complementary beaded part of window 25 hooks to form a mutual hinge. A sealing rubber 40 protrudes into a groove 34 provided for the purpose in casing frame 30 in order to seal window 25 when it is closed and locked counter to a resilient force of this sealing rubber by means of closing means (not shown here).

Figure 3:
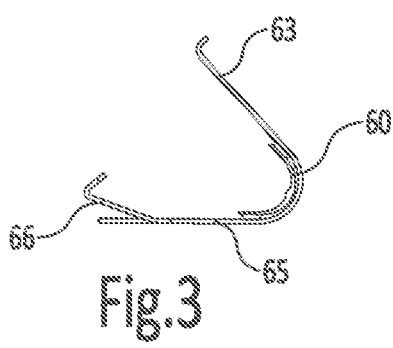
FIG. 3 shows a cross-section of a fastening clip as applied in the mobile accommodation of FIGS. 1A and 1B.

For a rapid and effective fixation of casing frame 30 in wall opening 20, the casing frame comprises according to the invention an insertion cavity 35 in the form of a groove running over a full length or height therein. Groove 35 is provided internally with a toothing of successive sawteeth, see FIG. 2. The casing frame is fixed by means of a number of fastening clips 60 which are distributed around the periphery of the window opening, see also FIG. 3, and which each comprise an insertion member 65 with a snap member 66 at an outer end thereof. As shown in FIG. 1A, these fastening clips each protrude with their insertion member into insertion cavity 35 of casing frame 30. These teeth of toothing 36 form a series of successive shoulders behind which snap member 66 of the fastening clip will click. The fastening clips take a resilient form, for instance of spring steel, so that as the clip with the insertion member is pushed further into the cavity the resilient end 66 will repeatedly click behind a shoulder located further along. A base part 63 of clip 60 simultaneously extends, see FIG. 1A, in order to thereby fix the casing frame in clearance-free manner in the wall opening under the spring tension imposed thereby. The casing frame can thus be fully secured in a short time in the wall opening without further tools being required. Base part 63 of the fastening clips optionally comprises an opening. This opening serves to enable later removal of fastening clip 60 if desired. Furthermore, a screw or other invasive fastening means can if desired be arranged therethrough so as to be received permanently in the wall. This provides anchoring of casing frame 30 in the wall, and thereby an extra guarantee against unintended detachment of frame 30 from the wall opening. For such a further securing it suffices for only several of the fastening clips to be thus anchored in wall 10. The others can be arranged in the wall without further operations.

Figure 4:
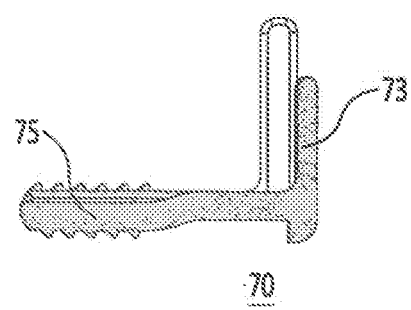
FIG. 4 shows a cross-section of a mounting body as applied in the mobile accommodation of FIGS. 1A and 1B.

Because insertion cavity 35 extends over a full length or height of casing frame 30, this provides the option of selecting the position of the fastening clips more or less at random while taking the specific situation into account. It is thus particularly possible to also utilize the same insertion cavity 35 for instance to attach a window covering unit, see FIG. 1B. The window covering unit comprises a cassette 50 of aluminum or plastic with a chamber 55 in which for instance one or more roller blinds (not shown) are suspended. These roller blinds can be rolled up and downward to serve as optionally completely light-proof blackout blind and/or as a mesh screen against flying insects. Serving for attachment of the window covering unit are a number of mounting bodies 70, see also FIG. 4, distributed along a length of cassette 50. These are components 70 of plastic or aluminum with a base part 73 which slides in a groove 53 formed for the purpose in cassette 50 and an insertion part 75 remote therefrom which is received in insertion cavity 35 of casing frame 30 in similar manner as insertion member 65 of a fastening clip 60. Because of the elongate character of both insertion cavity 35 and groove 53 the mounting bodies 70 and fastening clips 60 can be freely arranged at separate positions and do not impede each other. Groove 53 moreover provides space here for a back of fastening clips 60 so that these will be wholly non-visible. Outside cassette 50 a molding (not shown) can be arranged in a similar manner all round the opening 20 over casing frame 30, whereby the whole also has an attractive finish on an inner side. This molding moreover provides a base for attaching optional hinges and locks or other fittings for the window.

Although the invention has been further elucidated above with reference to only a single embodiment, it will be apparent that the invention is in no way limited thereto. On the contrary, many variations and embodiments are still possible within the scope of the invention for a person with ordinary skill in the art.

The invention claimed is:

1. Mobile accommodation, comprising a wall with a wall opening bounded by an edge, wherein in the wall opening a casing frame is received which is intended and configured to comprise an openable or non openable panel, which casing frame extends outside the wall opening on a first side of the wall and is fixed in the wall opening by means of fixation means, wherein the casing frame comprises at least one insertion cavity accessible from an opposite side of the wall, and wherein the fixation means comprise at least one fastening clip which at a first outer end comprises an insertion member which protrudes into the insertion cavity in order to effect a durable mutual connection therein and at a second outer end supports directly or indirectly on the wall, wherein the fastening clip comprises a curved resilient plate body, in particular of metal, and more particularly of spring steel.

2. Mobile accommodation as claimed in claim 1, wherein the second outer end of the fastening clip supports directly or indirectly in resilient manner on the wall counter to a spring tension.

3. Mobile accommodation as claimed in claim 1, wherein at least one fastening clip is anchored in the wall by means of an invasive fastening member.

4. Mobile accommodation as claimed in claim 1, wherein the insertion cavity extends in the casing frame over at least substantially a full length thereof.

5. Mobile accommodation as claimed in claim 4, wherein the window covering unit comprises an elongate groove which extends therein along at least substantially a full length and that the insertion member extends from a connecting body received for axial movement in the groove.

6. Mobile accommodation as claimed in claim 1, wherein the wall opening comprises a window opening which is provided on at least one side thereof with a window covering unit, and wherein the window covering unit comprises at least one insertion member which protrudes into the insertion cavity in order to effect a durable mutual connection therein.

7. Fastening clip of the type as applied in the mobile accommodation as claimed in claim 1, comprising an insertion member for receiving in an insertion cavity of a casing frame in order to make a durable connection therewith.

8. Casing frame of the type as applied in the mobile accommodation as claimed in claim 1, comprising an insertion cavity for receiving an insertion member of a fastening clip therein in order to make a durable connection therewith.

9. Mobile accommodation, comprising a wall with a wall opening bounded by an edge, wherein in the wall opening a casing frame is received which is intended and configured to comprise an openable or non openable panel, which casing frame extends outside the wall opening on a first side of the wall and is fixed in the wall opening by means of fixation means, wherein the casing frame comprises at least one insertion cavity accessible from an opposite side of the wall, and wherein the fixation means comprise at least one fastening clip which at a first outer end comprises an insertion member which protrudes into the insertion cavity in order to effect a durable mutual connection therein and at a second outer end supports directly or indirectly on the wall, wherein the insertion cavity comprises a snap cavity with a series of shoulders, and wherein the insertion member comprises a snap member which snaps behind a shoulder of the series of shoulders in the snap cavity.

10. Mobile accommodation as claimed in claim 9, wherein the snap member extends resiliently from an adjacent part of the fastening clip.

11. Mobile accommodation as claimed in claim 9, wherein the second outer end of the fastening clip supports directly or indirectly in resilient manner on the wall counter to a spring tension.

12. Mobile accommodation as claimed in claim 9, wherein at least one fastening clip is anchored in the wall by means of an invasive fastening member.

13. Mobile accommodation as claimed in claim 9, wherein the insertion cavity extends in the casing frame over at least substantially a full length thereof.

14. Mobile accommodation as claimed in claim 13, wherein the window covering unit comprises an elongate groove which extends therein along at least substantially a full length and that the insertion member extends from a connecting body received for axial movement in the groove.

15. Mobile accommodation as claimed in claim 9, wherein the wall opening comprises a window opening which is provided on at least one side thereof with a window covering unit, and wherein the window covering unit comprises at least one insertion member which protrudes into the insertion cavity in order to effect a durable mutual connection therein.

16. Fastening clip of the type as applied in the mobile accommodation as claimed in claim 9, comprising an insertion member for receiving in an insertion cavity of a casing frame in order to make a durable connection therewith.

17. Casing frame of the type as applied in the mobile accommodation as claimed in claim 9, comprising an insertion cavity for receiving an insertion member of a fastening clip therein in order to make a durable connection therewith.

* * * * *